(12) United States Patent
Mak

(10) Patent No.: US 11,116,356 B2
(45) Date of Patent: Sep. 14, 2021

(54) NON-ALTERNATING CURRENT (AC)-POWERED FLAMELESS HEATING SYSTEM

(71) Applicant: VIDACASA Limited, Wan Chai (HK)

(72) Inventor: Alexander Mak, Wan Chai (HK)

( * ) Notice: Subject to any disclaimer, the term of this patent is extended or adjusted under 35 U.S.C. 154(b) by 211 days.

(21) Appl. No.: 16/384,967

(22) Filed: Apr. 16, 2019

(65) Prior Publication Data
US 2020/0329905 A1 Oct. 22, 2020

(51) Int. Cl.
*A47J 36/24* (2006.01)
*A47J 27/00* (2006.01)

(52) U.S. Cl.
CPC ......... *A47J 36/2405* (2013.01); *A47J 27/004* (2013.01)

(58) Field of Classification Search
CPC .... A47J 36/2405; A47J 36/24; A47J 36/2422; A47J 33/00; A47J 36/28; A47J 36/30; A47J 36/2477; A47J 41/005; A47J 39/006; A47J 39/02; A47J 36/245
USPC ........ 126/99 R, 1 R, 29, 59, 39 M, 30, 39 F, 126/763.05, 33, 44, 263.06, 265; 99/483, 99/324
See application file for complete search history.

(56) References Cited

U.S. PATENT DOCUMENTS

| 2,636,489 | A | * | 4/1953 | Di Stefano | A47J 36/28 126/263.05 |
| 3,314,413 | A | * | 4/1967 | Cambridge | F24C 9/00 126/263.09 |
| 3,608,770 | A | * | 9/1971 | Naimoli | A47J 39/006 220/575 |
| 4,510,919 | A | * | 4/1985 | Benmussa | A45C 11/20 126/263.08 |
| 4,809,373 | A | * | 3/1989 | Murray | A47D 9/04 5/107 |
| 5,295,475 | A | * | 3/1994 | Kaneko | B65D 81/3484 126/246 |
| 5,355,869 | A | * | 10/1994 | Pickard | A47J 36/28 126/263.01 |
| 2010/0059039 | A1 | * | 3/2010 | Cudnohoske | B65D 81/3484 126/263.01 |
| 2012/0231138 | A1 | * | 9/2012 | Poston | A47J 36/28 426/520 |
| 2014/0102435 | A1 | * | 4/2014 | Sesock | F24V 30/00 126/263.02 |
| 2018/0344083 | A1 | * | 12/2018 | Mak | B65D 81/3484 |

* cited by examiner

*Primary Examiner* — Justin M Jonaitis
(74) *Attorney, Agent, or Firm* — Prakash Nama; Global IP Services, PLLC

(57) ABSTRACT

The present invention relates to a non-AC powered flameless heating system which includes a plurality of compartments each for receiving a liquid-activated heating element; an activating liquid receptacle for receiving a liquid capable of activating the liquid-activated heating element to release heat; and a liquid conducting means for sequentially, in time, conducting the liquid in the activating liquid receptacle to the plurality of compartments in an amount sufficient to activate the liquid-activated heating element in the compartments. The present invention is safe and convenient to use and capable of providing heat supply for a prolonged period of time.

10 Claims, 3 Drawing Sheets

NON-ALTERNATING CURRENT (AC)-POWERED FLAMELESS HEATING SYSTEM

BACKGROUND OF THE INVENTION

The present invention relates to a heating system and more particularly pertains to a non-AC powered flameless heating system.

Chafing dishes are commonly used in serving buffet. Traditional chafing dishes use convention gel or liquid fuel to heat the food items; however, with the existence of open flames, it could be dangerous to use traditional chafing dishes in crowded environment or around children. Electric chafing dishes which eliminate open flames are also available, but they are less portable as they need to be connected to an external socket for power supply.

BRIEF SUMMARY OF THE INVENTION

In view of the aforesaid disadvantages now present in the prior art, the present invention provides a non-Alternating Current (AC) powered flameless heating system which is safe and convenient to use and capable of providing heat supply for a prolonged period of time.

To attain this, the present invention generally comprises a plurality of compartments each for receiving a liquid-activated heating element; an activating liquid receptacle for receiving a liquid capable of activating the liquid-activated heating element to release heat; and a liquid conducting means for sequentially, in time, conducting the liquid in the activating liquid receptacle to the plurality of compartments in an amount sufficient to activate the liquid-activated heating element in the compartments.

The liquid conducting means comprises a plurality of pumps positioned in the activating liquid receptacle, each of which is associated with each of the plurality of compartments and operably connected to a conduit for pumping the liquid in the activating liquid receptacle to the associated compartment; a controller operably connected to the plurality of pumps for sequentially, in time, activating the pumps to pump the liquid in the activating liquid receptacle to the compartments in an amount sufficient to activate the liquid-activated heating element in the compartments; and a power supply electrically connected to the controller and the pumps for powering the controller and the pumps.

The plurality of compartments are positioned adjacent to each other.

It further comprises a box-shaped cover comprising a bottom panel, a top panel and a plurality of side panels for covering the plurality of compartments; the bottom panel is provided with a plurality of groups of through holes, each of which corresponds in position to each of the plurality of compartments; the top panel is provided with a central opening.

It further comprises a controller housing for accommodating the controller and the power supply; the controller housing, the plurality of compartments, the box-shaped cover and the activating liquid receptacle are integrally formed as a whole to form a heater body.

It further comprises an open top heater housing with a bottom portion for receiving the heater body and a top portion for receiving a receptacle for receiving objects to be heated.

The open top heater housing is made of thermal-isolated material.

There is a gap between the top panel of the box-shaped cover and the receptacle.

There is a gap between the open top heater housing and the receptacle.

The receptacle is a food tray made of heat conducting material, and the objects to be heated are food items.

The liquid in the receptacle is water, and the liquid-activated heating element is a water-activated heat pad.

The liquid conducting means is configured to perform the following operations upon activation: (i) conduct the liquid in the activating liquid receptacle to a first one of the plurality of compartments; (ii) after a predetermined time period has passed, conduct the liquid in the activating liquid receptacle to a subsequent one of the plurality of compartments; (iii) repeat (ii) until all the plurality of compartments are filled with the liquid in the activating liquid receptacle; the predetermined time period is determined by a time period during which the liquid-activated heating element is capable of releasing heat.

DETAILED DESCRIPTION OF THE INVENTION

Figure 1:
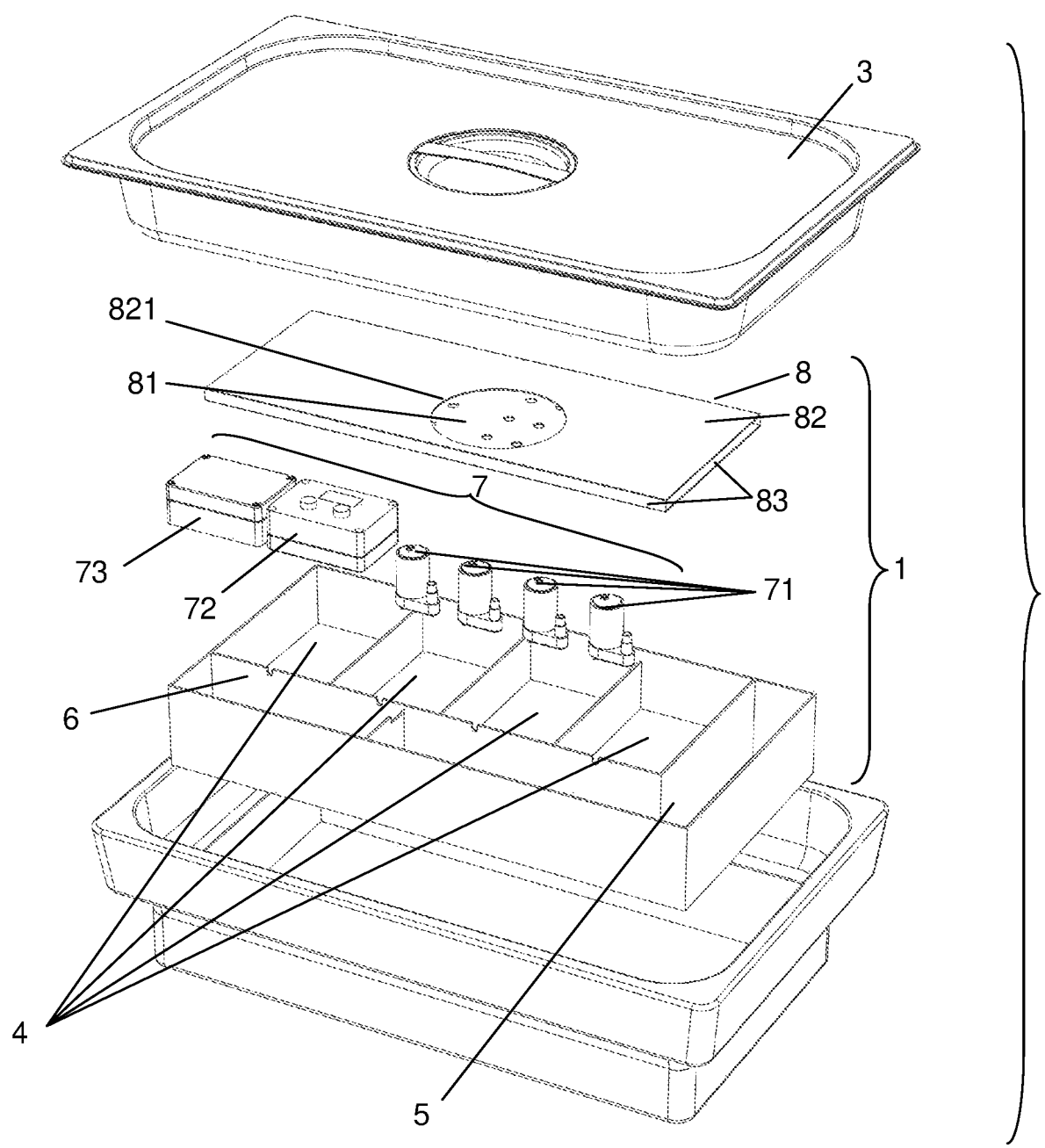
FIG. 1 is a disassembling view of a preferred embodiment of the present invention.
Figure 2:
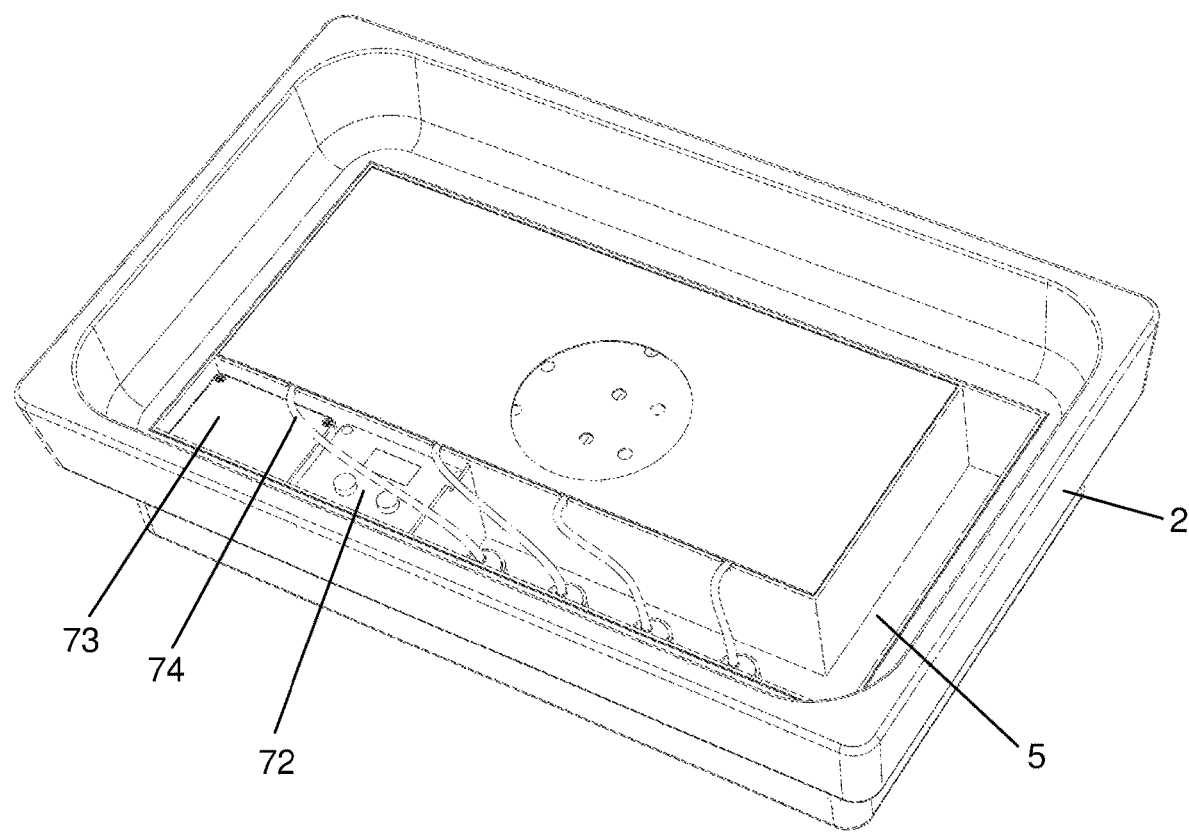
FIG. 2 is a perspective view of the heater body received in the open top heater housing of the preferred embodiment of the present invention as illustrated in FIG. 1.
Figure 3:
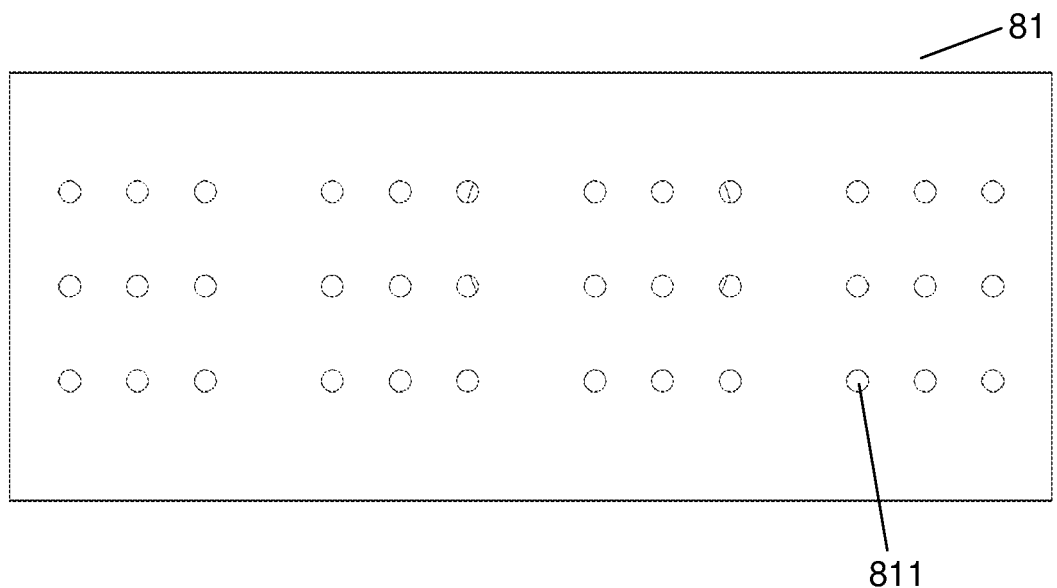
FIG. 3 is a top plan view of the bottom panel of the box-shaped cover of the preferred embodiment of the present invention as illustrated in FIG. 1.
Figure 4:
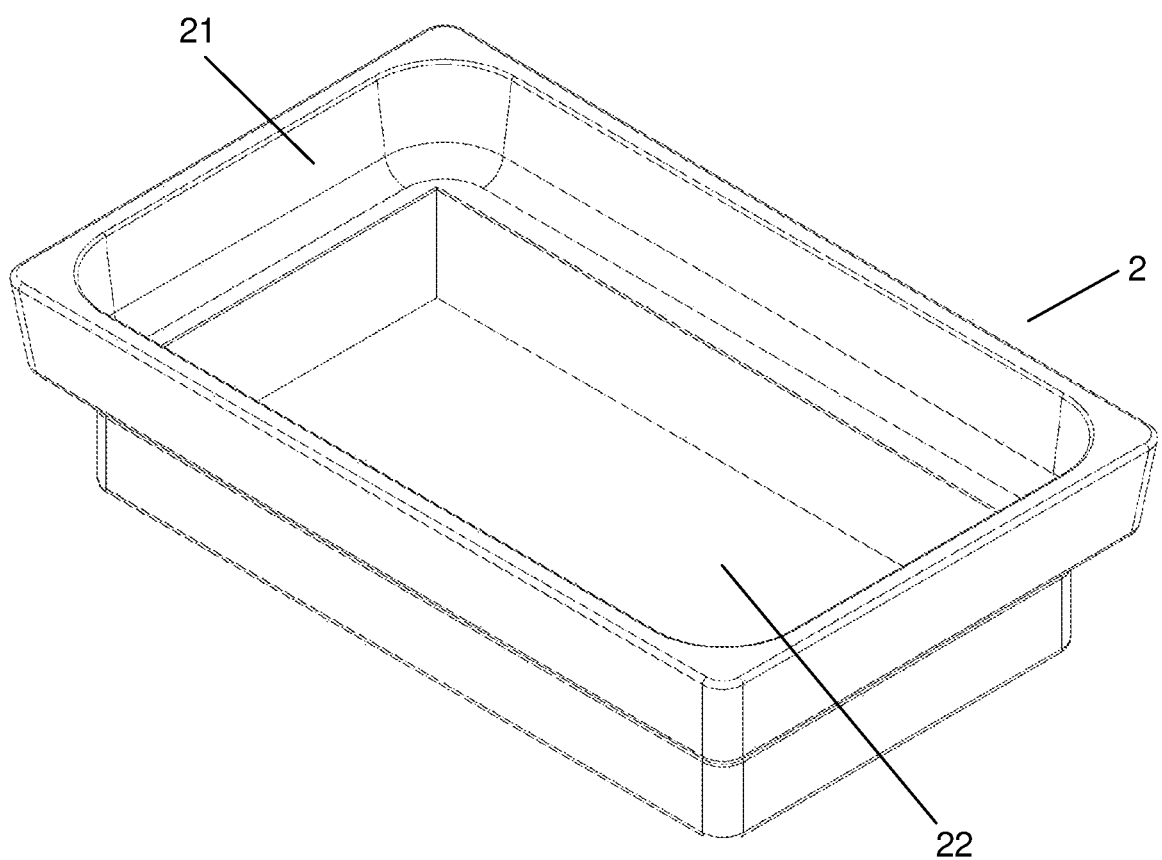
FIG. 4 is a perspective view of the open top heater housing of the preferred embodiment of the present invention as illustrated in FIG. 1.

As illustrated in FIGS. 1 to 4, the non-AC powered flameless heating system of a preferred embodiment of the present invention comprises a heater body 1, an open top heater housing 2 and a receptacle 3 for receiving objects to be heated. In this embodiment, the heating system is for heating food and the receptacle 3 is in form of a food tray made of heat conducting material, which is stainless steel in the present embodiment, for receiving food items to be heated.

The heater body 1 is integrally formed by four compartments 4, a box-shaped cover 8, an activating liquid receptacle 5 and a controller housing 6. Each of the four compartments 4 is for receiving a liquid-activated heating element. In this embodiment, the liquid-activated heating element is a water-activated heat pad activated by water to release heat for a time period of half an hour. Such water-activated heat pad in available in the prior art and thus the details of which are not repeated herein. The activating liquid receptacle 5 is for receiving a liquid for activating the liquid-activated heating element to release heat, which is water in this embodiment. The liquid in the activating liquid receptacle 5 is conducted by a liquid conducting means 7 sequentially, in time, to the four compartments 4 in an amount sufficient to activate the liquid-activated heating element in the compartments 4.

The liquid conducting means 7 comprises four pumps 71, a controller 72 and a power supply 73. The four pumps 71 are positioned in the activating liquid receptacle 5. Each of the four pumps 71 is associated with each of the four compartments 4 and operably connected to a conduit 74 for pumping the liquid in the activating liquid receptacle 5 to the associated compartment 4. The controller 72 is operably connected to the four pumps 71 for sequentially, in time, activating the pumps 71 to pump the liquid in the activating liquid receptacle 5 to the compartments 4 in an amount sufficient to activate the liquid-activated heating element in the compartments 4. The power supply 73 in form of batteries is electrically connected to the controller 72 and the pumps 71 for powering the controller 72 and the pumps 71. The controller 72 and the power supply 73 are accommodated in the controller housing 6.

In this embodiment, the four compartments 4 are positioned adjacent to each other one by one. The top of the four compartments 4 are covered by the box-shaped cover 8 comprising a bottom panel 81, a top panel 82 and four side panels 83. The bottom panel 81 is provided with four groups of through holes 811, each of which corresponds in position to each of the four compartments 4. The top panel 82 is provided with a central opening 821. The open top heater housing 2 is provided with a bottom portion 21 and a top portion 22. The bottom portion 21 receives the heater body 1 formed by the controller housing 6, the four compartments 4, the box-shaped cover 8 and the activating liquid receptacle 5. The top portion 22 receives the receptacle 3. The open top heater housing 2 is made of thermal-isolated material. There is a gap between the top panel 82 of the box-shaped cover 8 and the receptacle 3. There is also a gap between the open top heater housing 2 and the receptacle 3 for venting the water vapor produced by heating the water in the compartments 4.

The operation of the present embodiment is detailed as follows: (1) Position the heater body 1 in the bottom portion 21 of the open top heater housing 2; (2) Position a water-activated heat pad in each of the four compartments 4 and then cover the four compartments 4 with the box-shaped cover 8; (3) Fill the activating liquid receptacle 5 with water; (4) Switch on the controller 72; (5) Position the receptacle 3 in the top portion 22 of the open top heater housing 2. As the controller 72 is switched on, the controller 72 first activates the first pump 71 to pump the water in the activating liquid receptacle 5 to the first compartment 4 in an amount sufficient to activate the water-activated heat pad in the first compartment 4. As the water-activated heat pad in the first compartment 4 is activated by water, heat is produced and water in the first compartment 4 is heated and produces water vapor; the water vapor will be vented through the through holes 811 on the bottom panel 81 corresponding to the first compartment 4 and dispersed in the box-shaped cover 8 and eventually vented via the central opening 821 of the top panel 82, the gap between the top panel 82 of the box-shaped cover 8 and the receptacle 3, and the gap between the open top heater housing 2 and the receptacle 3. As heat is produced, the heater body 1 will become very hot; the open top heater housing made of thermal-isolated material prevents the user from injuring his hands when touching the present invention. After the elapse of a time period of half an hour, which is the time period that the water-activated heat pad is capable of releasing heat after activation, the controller 72 activates the second pump 71 to pump the water in the activating liquid receptacle 5 to the second compartment 4 in an amount sufficient to activate the water-activated heat pad in the second compartment 4. The aforementioned process is repeated until all four compartments 4 are filled with water, resulting in a total of two hours of heat supply without the need of manual operation during the two hours of heat supply.

The above embodiment is a preferred embodiment of the present invention. The present invention is capable of other embodiments and is not limited by the above embodiment. Any other variation, decoration, substitution, combination or simplification, whether in substance or in principle, not deviated from the spirit of the present invention, is replacement or substitution of equivalent effect and falls within the scope of protection of the present invention.

What is claimed is:

1. A non-Alternating Current (AC) powered flameless heating system comprising
    a plurality of compartments each for receiving a liquid-activated heating element;
    an activating liquid receptacle for receiving a liquid capable of activating the liquid-activated heating element to release heat;
    a liquid conducting means for sequentially, in time, conducting the liquid in the activating liquid receptacle to the plurality of compartments in an amount sufficient to activate the liquid-activated heating element in the compartments;
    the liquid conducting means comprises
    a plurality of pumps positioned in the activating liquid receptacle, each of which is associated with each of the plurality of compartments and operably connected to a conduit for pumping the liquid in the activating liquid receptacle to the associated compartment;
    a controller operably connected to the plurality of pumps for sequentially, in time, activating the pumps to pump the liquid in the activating liquid receptacle to the compartments in an amount sufficient to activate the liquid-activated heating element in the compartments;
    a power supply electrically connected to the controller and the pumps for powering the controller and the pumps.

2. The non-Alternating Current (AC) powered flameless heating system as in claim 1, wherein the plurality of compartments are positioned adjacent to each other.

3. The non-Alternating Current (AC) powered flameless heating system as in claim 2, further comprising a box-shaped cover comprising a bottom panel, a top panel and a plurality of side panels for covering the plurality of compartments; the bottom panel is provided with a plurality of groups of through holes, each of which corresponds in position to each of the plurality of compartments; the top panel is provided with a central opening.

4. The non-Alternating Current (AC) powered flameless heating system as in claim 3, further comprising a controller housing for accommodating the controller and the power supply; the controller housing, the plurality of compartments, the box-shaped cover and the activating liquid receptacle are integrally formed as a whole to form a heater body.

5. The non-Alternating Current (AC) powered flameless heating system as in claim 4, further comprising an open top heater housing with a bottom portion for receiving the heater body and a top portion for receiving a receptacle for receiving objects to be heated.

6. The non-Alternating Current (AC) powered flameless heating system as in claim 5, wherein the open top heater housing is made of thermal-isolated material.

7. The non-Alternating Current (AC) powered flameless heating system as in claim 5, wherein there is a gap between the top panel of the box-shaped cover and the receptacle.

8. The non-Alternating Current (AC) powered flameless heating system as in claim 5, wherein there is a gap between the open top heater housing and the receptacle.

9. The non-Alternating Current (AC) powered flameless heating system as in claim 5, wherein the receptacle is a food tray made of heat conducting material, and the objects to be heated are food items.

10. The non-Alternating Current (AC) powered flameless heating system as in claim 1, wherein the liquid in the receptacle is water, and the liquid-activated heating element is a water-activated heat pad.

* * * * *